(12) United States Patent
Lin

(10) Patent No.: US 11,487,163 B2
(45) Date of Patent: Nov. 1, 2022

(54) DISPLAY PANEL AND DISPLAY APPARATUS

(71) Applicants: HKC CORPORATION LIMITED, Shenzhen (CN); CHONGQING HKC OPTOELECTRONICS TECHNOLOGY CO., LTD., Chongqing (CN)

(72) Inventor: Jia-Ren Lin, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 952 days.

(21) Appl. No.: 16/319,816

(22) PCT Filed: Nov. 21, 2018

(86) PCT No.: PCT/CN2018/116726
§ 371 (c)(1),
(2) Date: Jan. 22, 2019

(87) PCT Pub. No.: WO2020/093457
PCT Pub. Date: May 14, 2020

(65) Prior Publication Data
US 2021/0356779 A1    Nov. 18, 2021

(30) Foreign Application Priority Data

Nov. 6, 2018 (CN) .......................... 201821830211.8

(51) Int. Cl.
*G02F 1/1339* (2006.01)
*G02F 1/1362* (2006.01)
*G02F 1/1335* (2006.01)

(52) U.S. Cl.
CPC ...... *G02F 1/1339* (2013.01); *G02F 1/133512* (2013.01); *G02F 1/136272* (2021.01); *G02F 2202/28* (2013.01)

(58) Field of Classification Search
CPC ............. G02F 1/1339; G02F 1/136272; G02F 1/133512; G02F 2202/28
(Continued)

(56) References Cited

U.S. PATENT DOCUMENTS 5,610,742 A * 3/1997 Hinata .................. G02F 1/1333
  349/122
2010/0225871 A1 * 9/2010 Maruyama ............ G02F 1/1341
  349/153
(Continued)

FOREIGN PATENT DOCUMENTS

| CN | 101393343 A | 3/2009 |
| CN | 102314013 A | 1/2012 |

(Continued)

OTHER PUBLICATIONS

International Search Report issued in corresponding International application No. PCT/CN2018/116726, dated Jul. 29, 2019(8 pages).
(Continued)

*Primary Examiner* — Edward J Glick
*Assistant Examiner* — David Y Chung

(57) ABSTRACT

This application discloses a display panel and a display apparatus. The display panel includes: a substrate; a seal, arranged around a non-display region of the substrate, to form a sealing region; a peripheral component, exposed out of the sealing region; and a protection component, covering the peripheral component. The peripheral component includes a metal line and a black matrix. The protection component includes a seal, a support spacer, a Tuffy adhesive, a black adhesive, and a passivation layer. The Tuffy (Continued)

adhesive is attached on a side portion of the substrate, to completely cover the metal line and the black matrix.

4 Claims, 5 Drawing Sheets

(58) Field of Classification Search
USPC .......................................................... 349/153
See application file for complete search history.

(56) References Cited

U.S. PATENT DOCUMENTS

| | | | |
|---|---|---|---|
| 2013/0242242 A1* | 9/2013 | Saida | G02F 1/1345 445/25 |
| 2016/0118416 A1* | 4/2016 | Yamazaki | H01L 27/1218 349/38 |
| 2016/0196775 A1* | 7/2016 | Park | G09G 3/20 345/211 |
| 2019/0258096 A1* | 8/2019 | Chien | G02F 1/1333 |
| 2020/0124787 A1* | 4/2020 | Chen | G02F 1/133512 |

FOREIGN PATENT DOCUMENTS

| | | | | |
|---|---|---|---|---|
| CN | 102981322 A | | 3/2013 | |
| CN | 104460070 A | | 3/2015 | |
| CN | 106646972 A | * | 5/2017 | ........... G02F 1/1333 |
| CN | 106647074 A | | 5/2017 | |
| CN | 107272252 A | | 10/2017 | |
| JP | 2009162894 A | | 7/2009 | |

OTHER PUBLICATIONS

Written Opinion of the International Searching Authority for No. PCT/CN2018/116726.

* cited by examiner

DISPLAY PANEL AND DISPLAY APPARATUS

This application claims priority to Chinese Patent Application No. CN201821830211.8, filed with the Chinese Patent Office on Nov. 6, 2018, and entitled "DISPLAY PANEL AND DISPLAY APPARATUS", which is incorporated herein by reference in its entirety.

TECHNICAL FIELD

This application relates to the field of display technologies, and in particular, to a display panel and a display apparatus.

BACKGROUND

The description herein provides only background information related to this application, but does not necessarily constitute the existing technology.

With the development and progress of sciences and technologies, because flat-panel displays have hot spots such as a thin body, power saving, and low radiation, the flat-panel displays are mainstream products of displays, and are widely applied. The flat-panel displays include a thin film transistor liquid crystal display (TFT-LCD), an organic light-emitting diode (OLED) display, and the like. The TFT-LCD refracts light of a backlight module by controlling rotation directions of liquid crystal molecules, to generate a picture, and has a plurality of advantages such as a thin body, power saving, and no radiation. The OLED display is manufactured by using organic light-emitting diodes, and has a plurality of advantages such as self-light emission, a short response time, high definition resolution and contrast, and achievable flexible display and large-area full-color display.

To pursue an aesthetic design of high penetrability and a narrow frame of the display, a location at which a seal is coated is limited. Consequently, a metal line is corroded or a black matrix on a side of a color filter is peeled off, and adhesion of the seal is poor, resulting in a large quantity of liquid crystal bubbles.

SUMMARY

An objective of this application is to provide a display panel and a display apparatus, so that a metal line or a black matrix is not protected from external corrosion.

To achieve the objective, this application provides a display panel. The display panel comprises: a substrate; a seal, arranged around a non-display region of the substrate, to form a sealing region: a peripheral component, exposed out of the sealing region; and a protection component, covering the peripheral component.

Optionally, the peripheral component comprises a metal line, a material of the protection component is a seal, and the seal completely wraps the metal line.

Optionally, the peripheral component comprises a metal line, the protection component comprises a support spacer, one end of the support spacer is connected to the substrate and the metal line, another end of the support spacer is connected to the seal, and the support spacer completely covers the metal line.

Optionally, the peripheral component comprises a metal line, the protection component comprises a Tuffy adhesive, the Tuffy adhesive is attached on a side portion of the substrate, and the Tuffy adhesive completely covers the metal line.

Optionally, the peripheral component comprises a metal line, the protection component comprises a black adhesive, one end of the black adhesive is arranged at an edge of the substrate, and another end of the black adhesive is arranged on upper and lower surfaces of the substrate.

Optionally, the peripheral component comprises a metal line, the protection component comprises a passivation layer, one end of the passivation layer is connected to upper and lower surfaces of the substrate, and another end of the passivation layer is connected to the seal.

Optionally, the peripheral component comprises a black matrix, the protection component is a seal, and the protection component completely wraps the black matrix.

Optionally, the peripheral component comprises a black matrix, the protection component comprises a support spacer, one end of the support spacer is connected to the substrate and the black matrix, another end of the support spacer is connected to the seal, and the support spacer completely covers the metal line.

Optionally, the peripheral component comprises a black matrix, the protection component comprises a Tuffy adhesive, the Tuffy adhesive is attached on a side portion of the substrate, and the Tuffy adhesive completely covers the metal line.

Optionally, the peripheral component comprises a black matrix, the protection component comprises a black adhesive, one end of the black adhesive is arranged at an edge of the substrate, another end of the black adhesive is arranged on upper and lower surfaces of the substrate, and the black adhesive completely covers the black matrix.

Optionally, the peripheral component comprises a black matrix, the protection component comprises a passivation layer, one end of the passivation layer is connected to upper and lower surfaces of the substrate, another end of the passivation layer is connected to the seal, and the passivation layer completely covers the black matrix.

Optionally, the metal line comprises a repair line, the repair line is arranged as a data drive line for repairing the display panel, and the seal completely wraps the repair line.

Optionally, the metal line comprises a repair line, the repair line is arranged as a data drive line for repairing the display panel, one end of the support spacer is connected to the substrate and the repair line, another end of the support spacer is connected to the seal, and the support spacer completely covers the repair line.

Optionally, the metal line comprises a repair line, the repair line is arranged as a data drive line for repairing the display panel, the Tuffy adhesive is attached on the side portion of the substrate, and the Tuffy adhesive completely wraps the repair line.

Optionally, the metal line comprises a repair line, the repair line is arranged as a data drive line for repairing the display panel, one end of the black adhesive is attached at the edge of the substrate, another end of the black adhesive is arranged on the upper and lower surfaces of the substrate, and the black adhesive completely wraps the repair line.

Optionally, the metal line comprises a repair line, the repair line is arranged as a data drive line for repairing the display panel, one end of the passivation layer is connected to the upper and lower surfaces of the substrate, and another end of the passivation layer is connected to the repair line.

This application further discloses a display panel, comprising: a substrate; a seal, arranged around a non-display region of the substrate, to form a sealing region; a peripheral component, exposed out of the sealing region; and a protection component, covering the peripheral component.

The peripheral component comprises a metal line and a black matrix, the protection component comprises a Tuffy adhesive, the Tuffy adhesive is arranged at an edge of the substrate and is attached on a side portion of the substrate, and the Tuffy adhesive completely covers the metal line and the black matrix.

This application further discloses a display apparatus, comprising a display panel, wherein the display panel comprises: a substrate; a seal, arranged around a non-display region of the substrate, to form a sealing region; a peripheral component, exposed out of the sealing region; and a protection component, covering the peripheral component.

Relative to a solution in which no protection component is provided, in this application, to prevent the property of the peripheral component from being affected by an external environment, the protection component is configured to protect the peripheral component. The protection component can cover the peripheral component, so that the peripheral component is isolated from external air, thereby improving an anti-corrosion capability of the peripheral component.

BRIEF DESCRIPTION OF DRAWINGS

The accompanying drawings included are used for helping understand the embodiments of this application, constitute a part of this specification, illustrate examples of the embodiments of this application and, together with the description, serve to explain the principles of this application. Obviously, the accompanying drawings in the following description are merely some embodiments of this application. For a person of ordinary skill in the art, the person may obtain other drawings according to these accompanying drawings without creative effects. In the accompanying drawings.

DETAILED DESCRIPTION

Figure 1:
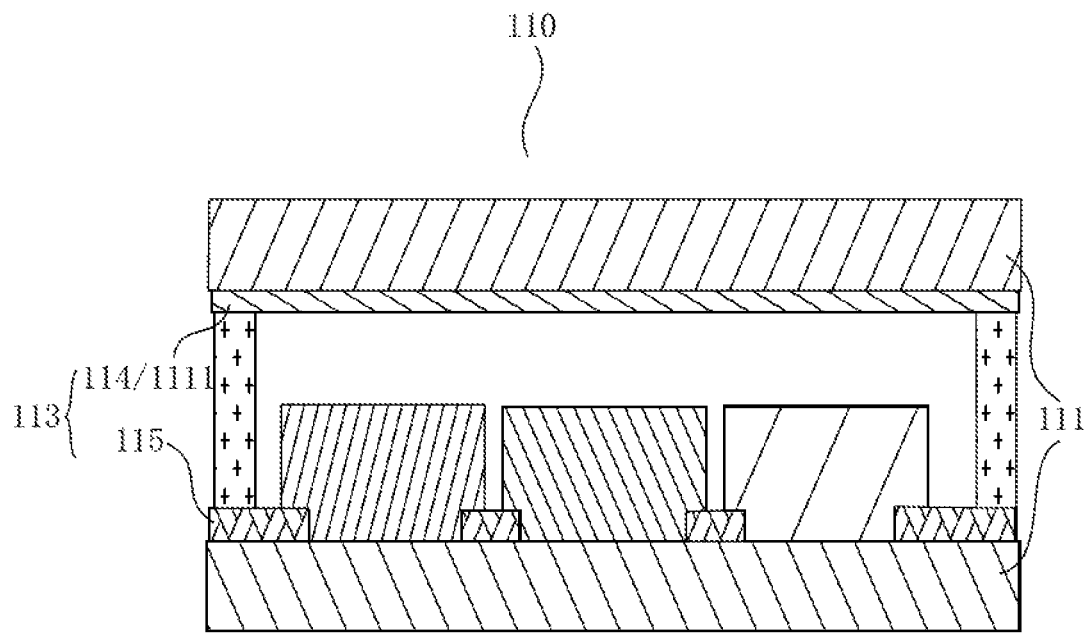
FIG. 1 is a schematic diagram of a display panel not covered by a protection component according to an embodiment of this application.

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or element must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly include one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection: or the connection may be a direct connection, an indirect connection through an intermediary, or internal communication between two elements. A person of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

To pursue an aesthetic design of high penetrability and a narrow frame of a display panel 110, a location at which a seal 112 is coated is limited. Generally, the seal 112 is not designed to wrap a metal edge emerging after a substrate 111 is cut and a black matrix 115 on a side of a color filter. Consequently, a part of the metal line 114 and a part of the black matrix 115 are exposed. In a particular environment, the exposed metal line 114 is corroded, and the black matrix 115 is peeled off, resulting in poor adhesion of the seal 112 and a large quantity of liquid crystal bubbles.

This application is further described below with reference to the accompanying drawings and optional embodiments.

As shown in FIG. 1 to FIG. 8, embodiments of this application disclose a display panel 110. The display panel 110 includes: a substrate 111; a seal 112, arranged around a non-display region of the substrate 111, to form a sealing region; a peripheral component 113, exposed out of the sealing region; and a protection component 116, covering the peripheral component 113.

In this solution, to prevent the property of the peripheral component 113 from being affected by an external environment, the protection component 116 is configured to protect the peripheral component 113. The protection component 116 can cover the peripheral component 113, so that the peripheral component 113 is isolated from external air, thereby improving an anti-corrosion capability of the peripheral component 113.

In this application, a direction of upper and lower surfaces of the substrate is a direction in which a black matrix points to a metal line.

Figure 2:
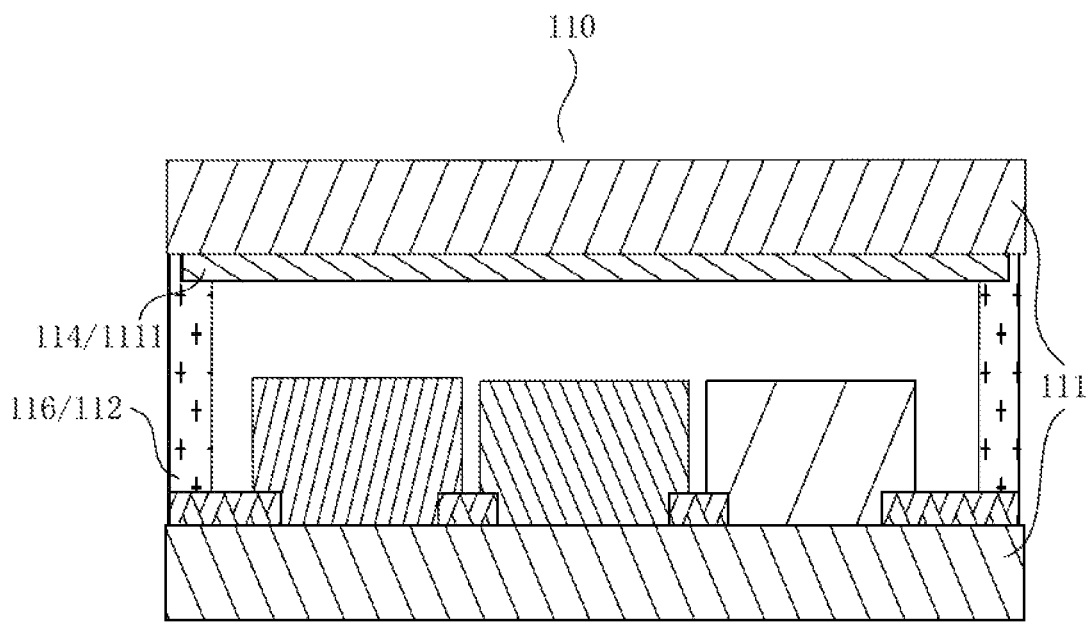
FIG. 2 is a schematic diagram of a display panel whose protection component is made of a seal according to an embodiment of this application.

In an embodiment, referring to FIG. 2, the peripheral component 113 includes a metal line 114, a material of the protection component 116 is a seal 112, and the seal 112 completely wraps the metal line 114.

In this solution, the seal 112 extends toward a periphery of the metal line 114 by a part on the original basis, so that the seal 112 wraps the exposed metal line 114. Therefore, the seal 112 completely covers the metal line 114, the metal line 114 is isolated from the outside, and an anti-corrosion capability of the metal line 114 is increased accordingly.

Figure 4:
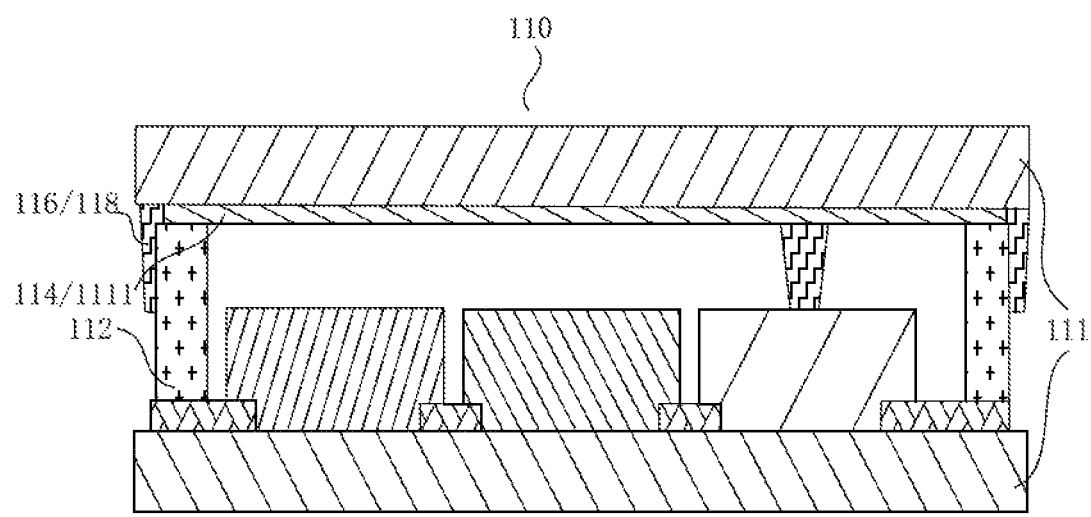
FIG. 4 is a schematic diagram of a display panel whose protection component is a support spacer according to an embodiment of this application.

In an embodiment, referring to FIG. 4, the peripheral component 113 includes a metal line 114, the protection component 116 includes a support spacer 118, one end of the support spacer 118 is connected to the substrate 111 and the metal line 114, another end of the support spacer 118 is connected to the seal 112, and the support spacer 118 completely covers the metal line 114.

In this solution, metal is easily corroded, and the metal line 114 also needs to be protected. The support spacer 118 is originally arranged between the substrates 111, does not corrode the display panel 110, has good adhesion, and can stably wrap a periphery of the metal line 114, so that the metal line 114 is isolated from external air, thereby improving an anti-corrosion capability of the metal line 114.

Figure 5:
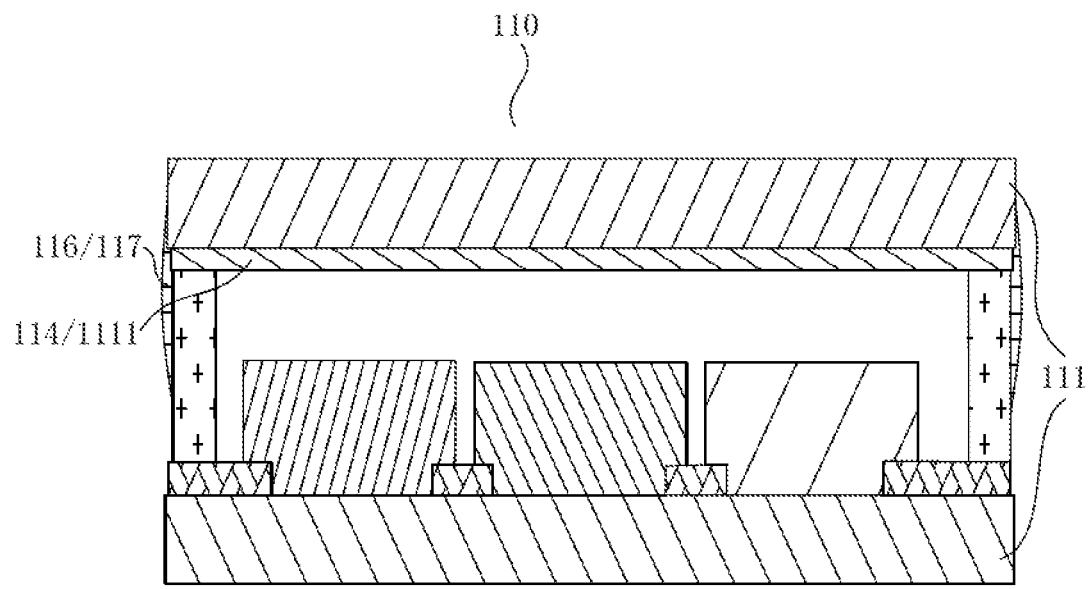
FIG. 5 is a schematic diagram of a display panel whose protection component is a Tuffy adhesive according to an embodiment of this application.

In an embodiment, referring to FIG. 5, the peripheral component 113 includes a metal line 114, the protection component 116 includes a Tuffy adhesive 117, the Tuffy adhesive 117 is attached on a side portion of the substrate 111, and the Tuffy adhesive 117 completely covers the metal line 114.

In this solution, in the industry of the display panel 110, a chip on flex region is usually coated with the Tuffy adhesive 117, to protect other exposed parts of a circuit board and the metal line 114. The Tuffy adhesive 117 has good adhesion and anti-corrosion capability. Only after a device coated with the Tuffy adhesive 117 is reconstructed and a periphery of the metal line 114 is also coated with the Tuffy adhesive 117 for protection, an originally exposed metal line 114 is covered and protected, so that the metal line 114 is isolated from external air, thereby improving an anti-corrosion function of the metal line 114.

Figure 8:
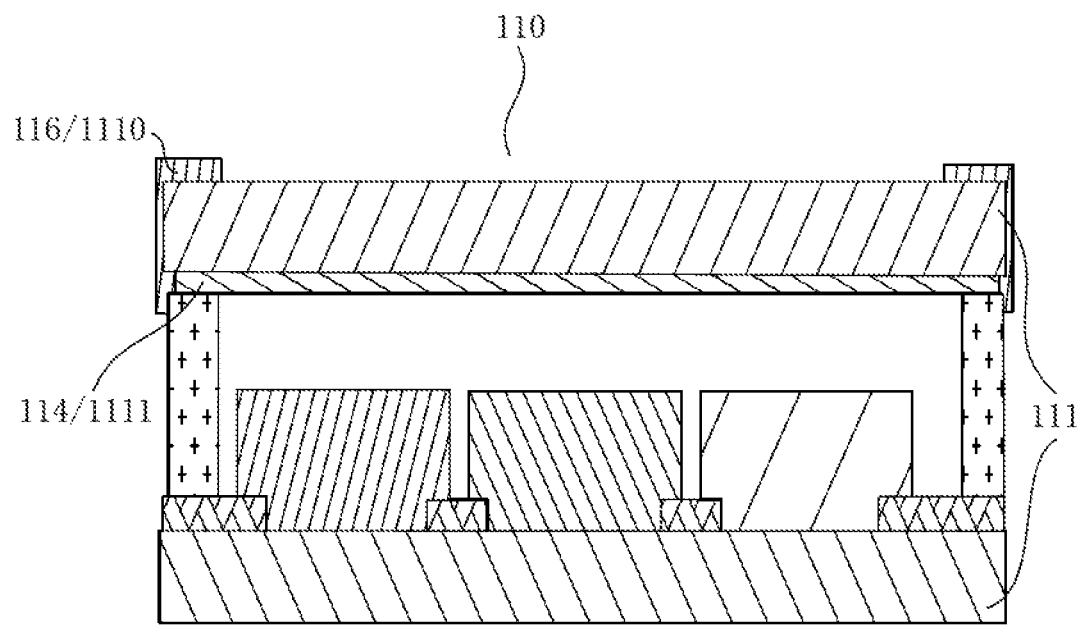
FIG. 8 is a schematic diagram of a display panel whose protection component is a black adhesive according to an embodiment of this application.

In an embodiment, referring to FIG. 8, the peripheral component 113 includes a metal line 114, the protection component 116 includes a black adhesive 1110, one end of the black adhesive 1110 is arranged on an edge of the substrate 111, and another end of the black adhesive 1110 is arranged on upper and lower surfaces of the substrate 111. The upper and lower surfaces of the substrate 111 are separately located at the top and the bottom of the substrate 111, and parallel and opposite to each other.

In this solution, the black adhesive 1110 has relatively good adhesion and water resistance. In addition, a frameless process includes coating of the black adhesive 1110. By using the process, the black adhesive 1110 completely covers the metal line 114, so that an effect of isolating the metal line 114 from external air is improved, thereby improving an anti-corrosion function of the metal line 114.

Figure 7:
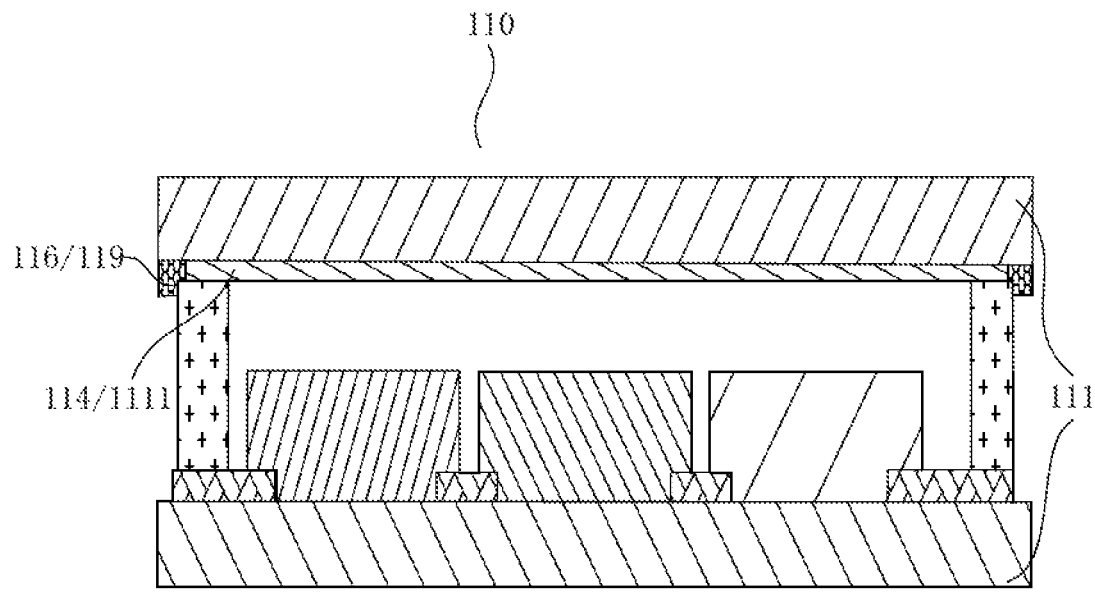
FIG. 7 is a schematic diagram of a display panel whose protection component is a passivation layer according to an embodiment of this application.

In an embodiment, referring to FIG. 7, the peripheral component 113 includes a metal line 114, the protection component 116 includes a passivation layer 119, one end of the passivation layer 119 is connected to upper and lower surfaces of the substrate 111, and another end of the passivation layer 119 is connected to the seal 112.

In this solution, the passivation layer 119 has good compactness, anti-corrosion performance, and coverage and is firm. In a manufacturing process, the passivation layer 119 needs to be manufactured, to ensure that the metal line 114 is protected for a long period of time, thereby improving an anti-corrosion function of the metal line 114.

In an embodiment, the peripheral component 113 includes a black matrix 115, the protection component 116 is the seal 112, a Tuffy adhesive 117, a support spacer 118, a black adhesive 1110, or a passivation layer 119, and the protection component 116 completely wraps the black matrix 115.

In this solution, the black matrix 115 is corroded and likely peeled off. The seal 112 extends toward a periphery of the black matrix 115 by a part on the original basis, so that the seal 112 wraps the exposed black matrix 115. The Tuffy adhesive 117 has good adhesion and anti-corrosion capability, and can prevent the black matrix from being in contact with outside environment in a good manner. The support spacer 118 is originally arranged between the substrates 111, does not corrode the display panel 110, has good adhesion, and can stably wrap the periphery of the black matrix 115. The black adhesive 1110 has good water resistance. In addition, a frameless process includes coating of the black adhesive 1110. By using the process, the black adhesive 1110 completely covers the black matrix 115. The passivation layer 119 has good compactness and chemical stability, and the passivation layer 119 needs to be manufactured in a manufacturing process. Operation is easy, and the black matrix 115 is isolated from the outside, thereby increasing an anti-corrosion capability of the black matrix 115 accordingly.

In an embodiment, referring to FIG. 1, in the display panel described in the foregoing embodiment, the metal line 114 includes a repair line 1111.

In this solution, the repair line 1111 is one type of the metal line 114. The repair line 1111 is arranged as a data drive line for repairing the display panel, so that repair stability is higher when a data signal line is cut off.

Figure 6:
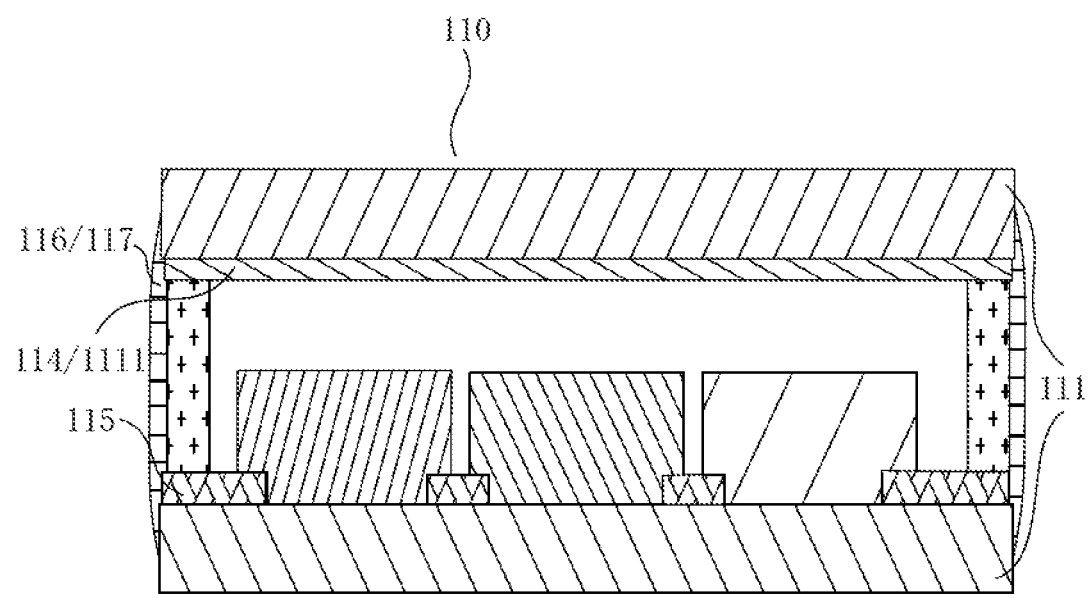
FIG. 6 is a schematic diagram of a display panel whose protection component is a Tuffy adhesive according to an embodiment of this application.

In an embodiment of this application, FIG. 1 and FIG. 6 disclose a display panel 110, including: a substrate 111; a seal 112, arranged around a non-display region of the substrate 111, to form a sealing region; a peripheral component 113, exposed out of the sealing region; and a protection component 116, covering the peripheral component 113. The protection component 116 does not corrode the display panel 110. The peripheral component 113 includes a metal line 114 and a black matrix 115. The metal line 114 includes a repair line. The protection component 116 includes a Tuffy adhesive 117. The Tuffy adhesive 117 is arranged on an edge of the substrate 111. The Tuffy adhesive 117 completely covers the metal line 114 and the black matrix 115.

To protect the metal line 114 or the black matrix 115 from being corroded by an external environment, the protection component 116 also cannot corrode the display panel 110, to also ensure normal operation of other components of the display panel 110. In the industry of the display panel 110, a COF region is usually coated with the Tuffy adhesive 117, to protect a circuit board and other exposed parts. The Tuffy adhesive 117 has good adhesion and anti-corrosion capability. Therefore, a coated area does not need to be excessively large, and a material is also saved. Only after a device coated with the Tuffy adhesive 117 is reconstructed, and a side edge of a control board is also coated with the Tuffy adhesive 117 for protection, so that the Tuffy adhesive 117 completely wraps the metal line 114 and the black matrix 115. That is, the originally exposed metal line 114 and black matrix 115 are wrapped and protected, thereby improving anti-corrosion functions of the metal line 114 and the black matrix 115.

Figure 3:
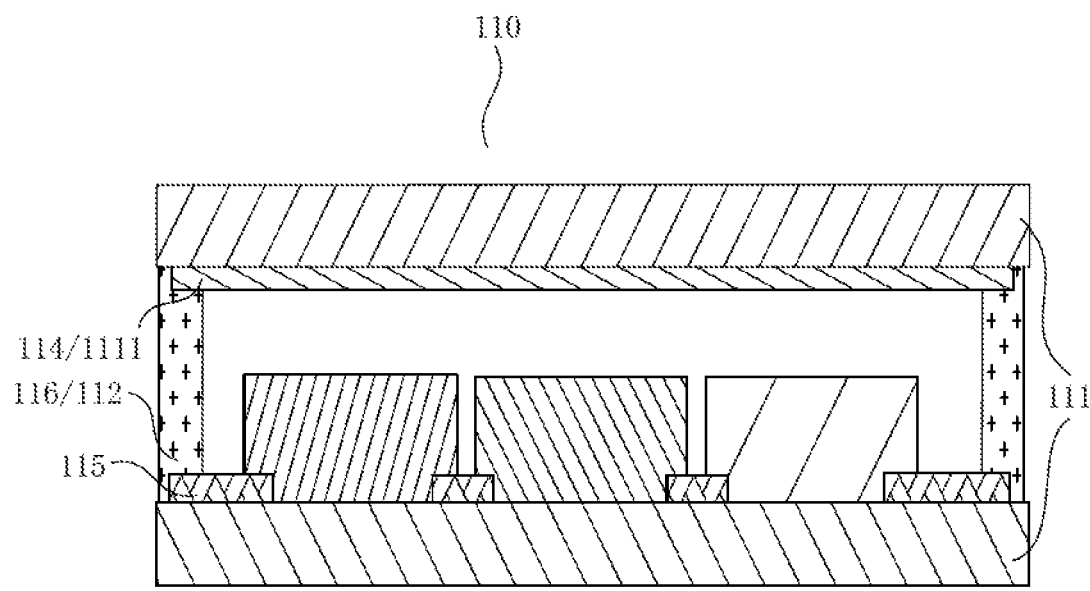
FIG. 3 is a schematic diagram of a display panel whose protection component is made of a seal according to an embodiment of this application.

In an embodiment of this application, FIG. 3 discloses a display panel 110, including: a substrate 111; a seal 112, arranged around a non-display region of the substrate 111, to form a sealing region; a peripheral component 113, exposed out of the sealing region; and a protection component 116, covering the peripheral component 113. The peripheral component 113 includes a metal line 114 and a black matrix 115. A material of the protection component 116 is a seal 112, and the seal 112 completely wraps the metal line 114 and the black matrix 115.

The seal 112 may extend toward parts that are of the metal line 114 and the black matrix 115 and that are close to outside on the original basis, so that the seal 112 wraps the exposed metal line 114 and black matrix 115. The seal 112 completely covers the metal line 114 and the black matrix 115, and the metal line 114 and the black matrix 115 are isolated from outside. The metal line 114 and the black matrix 115 are prevented from having a chemical reaction with an external environment, and anti-corrosion capabilities of the metal line 114 and the black matrix 115 are increased accordingly.

Figure 9:
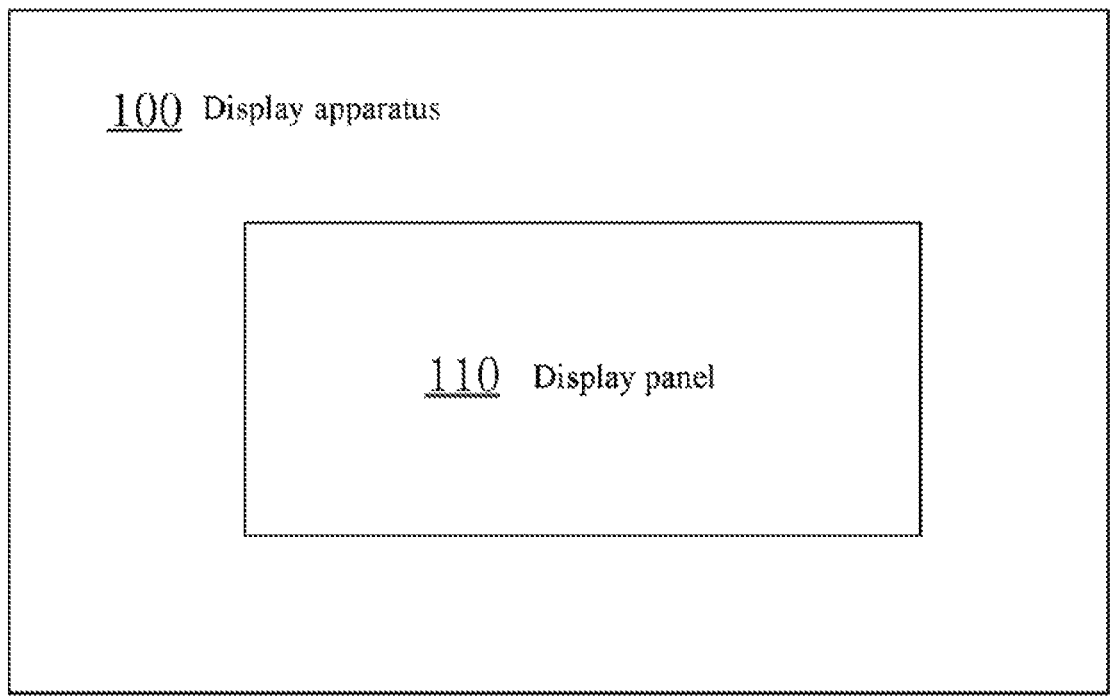
FIG. 9 is a schematic diagram of a display apparatus according to an embodiment of this application.

In another embodiment of this application, FIG. 9 discloses a display apparatus 100, including the display panel 110 according to any one of the foregoing embodiments.

The technical solutions in this application may be widely applied to flat-panel displays such as a TFT-LCD and an OLED display.

The foregoing contents are optional descriptions of this application in conjunction with specific optional embodiments, and it should not be considered that the specific implementation of this application is limited to these descriptions. A person of ordinary skill in the art can further make simple deductions or replacements without departing from the concept of this application, and such deductions or replacements should all be considered as falling within the protection scope of this application.

What is claimed is:
1. A display panel, comprising:
a substrate;
a seal, arranged around a non-display region of the substrate, to form a sealing region;
a peripheral component, exposed out of the sealing region; and
a protection component, covering the peripheral component;
wherein the peripheral component comprises a metal line, the protection component comprises a support spacer, one end of the support spacer is connected to the substrate and the metal line, an other end of the support spacer is connected to the seal, and the support spacer completely covers the exposed portion of the metal line.

2. The display panel according to claim 1, wherein the metal line comprises a repair line, the repair line is arranged as a data drive line for repairing the display panel, one end of the support spacer is connected to the substrate and the repair line, an other end of the support spacer is connected to the seal, and the support spacer completely covers the exposed portion of the repair line.

3. A display apparatus, comprising a display panel, wherein the display panel comprises:
a substrate;
a seal, arranged around a non-display region of the substrate, to form a sealing region;
a peripheral component, exposed out of the sealing region; and
a protection component, covering the peripheral component;
wherein the peripheral component comprises a metal line, the protection component comprises a support spacer, one end of the support spacer is connected to the substrate and the metal line, an other end of the support spacer is connected to the seal, and the support spacer completely covers the exposed portion of the metal line.

4. A display panel, comprising:
a substrate;
a seal, arranged around a non-display region of the substrate, to form a sealing region;
a peripheral component, exposed out of the sealing region; and
a protection component, covering the peripheral component;
wherein the peripheral component comprises a black matrix, the protection component comprises a support spacer, one end of the support spacer is connected to the substrate and the black matrix, and an other end of the support spacer is connected to the seal, and the support spacer completely covers the exposed portion of the black matrix.

* * * * *